United States Patent [19]

Appleyard

[11] 4,439,394
[45] Mar. 27, 1984

[54] HEAT SETTING METHOD

[75] Inventor: John A. Appleyard, Toledo, Ohio

[73] Assignee: Owens-Illinois, Inc., Toledo, Ohio

[21] Appl. No.: 439,259

[22] Filed: Nov. 5, 1982

[51] Int. Cl.³ ............................................. B29C 17/07
[52] U.S. Cl. .................................. 264/535; 264/523;
264/538; 425/526; 425/384; 425/407
[58] Field of Search ............... 264/523, 535, 537, 538,
264/539, 540, 541, 542, 543, 520, 521, 532;
425/526, 384, 407

[56] References Cited

U.S. PATENT DOCUMENTS

| | | | |
|---|---|---|---|
| 2,982,992 | 5/1961 | Jacobi | 264/539 X |
| 4,039,641 | 8/1977 | Collins | 264/535 X |
| 4,108,937 | 8/1978 | Martineu et al. | 264/535 X |
| 4,206,171 | 6/1980 | Uhlig | 264/520 |
| 4,264,558 | 4/1981 | Jacobsen | 264/523 |
| 4,385,089 | 5/1983 | Bonnebat et al. | 264/523 X |

FOREIGN PATENT DOCUMENTS

| | | | |
|---|---|---|---|
| 2059086 | 5/1971 | France | 264/540 |
| 839829 | 6/1960 | United Kingdom | 425/384 |

*Primary Examiner*—Jan H. Silbaugh
*Attorney, Agent, or Firm*—Thomas L. Farquer; M. E. Click

[57] ABSTRACT

Disclosed is a method and apparatus for orientation blow molding and heat setting of a thermally crystallizable polymer wherein the orientation blow molding is effected in a relatively low mass blow mold which is enclosed within a heated, high mass mold for transferring heat to the hollow article for heat setting; thereafter the outer mold is opened and the blow mold is cooled in a variety of methods in order to cool the heat set hollow article.

8 Claims, 4 Drawing Figures

HEAT SETTING METHOD

It is well known in the prior art to heat set oriented, partially crystalline hollow articles made by blow molding a preform or parison of an essentially amorphous but thermally crystallizable plastic under temperature conditions conducive to orientation to produce a partially crystalline hollow article. The heat setting comprises further heating the oriented, partially crystalline plastic article for a further time at least at the temperature of the orientation blow molding, but usually at a substantially higher temperature, and such heat setting increasing the crystallinity and the density of the hollow article and improves several properties as is well known in the art.

The present invention is a method and apparatus for effecting orientation blow molding, heat setting and cooling of a hollow article so made from such a thermally crystallizable polymer. In its broadest aspect, the present invention is a method and apparatus for effecting orientation blow molding of a parison or preform of such a polymer, heat setting the resulting oriented, blown hollow article and quickly separating said heat set article while under pressure while at substantially said heat setting temperature, from the source of heat providing said heat setting so as to release said source for the next blow molding and heat setting cycle.

It is an object of the present invention to provide an improved method and apparatus for heat setting and cooling a hollow plastic article.

It is a further object of the present invention to provide an improved method and apparatus for effecting orientation blow molding, heat setting and cooling under pressure of a hollow plastic article.

Other objects, as well as aspects and advantages of the present invention, will become apparent from a study of the accompanying specification, including the drawings and the claims.

According to a broad aspect of the present invention, I have provided a method of effecting orientation blow molding and heat setting of a thermally crystallizable polymer comprising (a) providing a hollow parison of an essentially amorphous, thermally crystallizable polymer, preheated to a temperature range conducive to orientation during stretching, (b) enclosing said parison in the halves of a blow mold of low mass capable of rapidly conducting heat, (c) enclosing said blow mold within the halves of a mold of much greater mass than said blow mold, preheated to a heat setting temperature at least as high as the orientation temperature of said parison, the interior contour of said preheated mold in closed position being essentially identical with and in contact with the exterior surface of said blow mold, (d) step (c) heating said blow mold to essentially the heat setting temperature of said preheated mold, (e) orientation blow molding said parison, by application of internal pneumatic pressure thereto, so that said parison tightly conforms to the interior contour of said blow mold and heat is transferred to the blown article by the hot walls thereof at said heat setting temperature, thus heat setting the blown hollow article, and thereafter (f) while maintaining at least sufficient pressure on said heat set article to prevent shrinkage thereof and thus to keep it in firm contact with the interior walls of said blow mold, removing said blow mold without cooling from said preheated mold. The process of the foregoing steps can then be repeated using another hollow parison and another blow mold of low mass, but using the same, still preheated mold in step (c). This is a great saving in cycle time, compared to effecting cooling of the article while the blow mold is still enclosed by the outer mold.

In another broad aspect of the present invention, I have provided a method of effecting orientation blow molding, heat setting and cooling of a thermally crystallizable polymer comprising (a) providing a hollow parison of an essentially amorphous, thermally crystallizable polymer, preheated to a temperature range conducive to orientation during stretching, (b) enclosing said parison in the halves of a blow mold of low mass capable of rapidly conducting heat, (c) enclosing said blow mold within the halves of a mold of much greater mass than said blow mold, preheated to a heat setting temperature at least as high as the orientation temperature of said parison, the interior contour of said preheated mold in closed position being essentially identical with and in contact with the exterior surface of said blow mold, (d) step (c) heating said blow mold to essentially the heat setting temperature of said preheated mold, (e) orientation blow molding said parison, by application of internal pneumatic pressure thereto, so that said parison tightly conforms to the interior contour of said blow mold and heat is transferred to the blown article by the hot walls thereof at said heat setting temperature, thus heat setting the blown hollow article, and thereafter (f) while maintaining at least sufficient pressure on said heat set article to prevent shrinkage thereof and thus to keep it in firm contact with the interior walls of said blow mold, removing said blow mold without cooling from said preheated mold, (g) cooling said blow mold to a desired cooling or quenching temperature below the temperature of said preheated mold and thus by contact with said blow mold cooling said heat set article while under pressure to the desired degree below the temperature of heat setting (usually at least 50° C. below), and thereafter (h) releasing the pressure from said article and opening the blow mold and removing the article therefrom. The cooling of the blow mold in step (f) can be effected by bathing the surface thereof with relatively cool heat transfer liquid or with jets of relatively cool gas, for instance, in addition to the cooling method shown in the drawings. Cooling can include contacting with a vaporizable liquid that vaporizes on contact with the hot mold, thus cooling partly by the heat of vaporization.

Further in accordance with the present invention, I have provided a method of effecting orientation blow molding, heat setting and cooling of a thermally crystallizable polymer comprising (a) providing a hollow parison of an essentially amorphous, thermally crystallizable polymer, preheated to a temperature range conducive to orientation during stretching, (b) enclosing said parison in the halves of a blow mold of low mass capable of rapidly conducting heat, (c) enclosing said blow mold within the halves of a mold of much greater mass than said blow mold, preheated to a heat setting temperature at least as high as the orientation temperature of said parison, the interior contour of said preheated mold in closed position being essentially identical with and in contact with the exterior surface of said blow mold, (d) step (c) heating said blow mold to essentially the heat setting temperature of said preheated mold, (e) orientation blow molding said parison, by application of internal pneumatic pressure thereto, so that said parison tightly conforms to the interior contour of said blow mold and heat is transferred to the blown article by the hot walls thereof at said heat setting temperature, thus heat setting the blown hollow article, and thereafter

(f) while maintaining at least sufficient pressure on said heat set article to prevent shrinkage thereof and thus to keep it in firm contact with the interior walls of said blow mold, removing said blow mold from said preheated mold and enclosing it in a cooling mold which is preconditioned to a desired cooling or quenching temperature below the temperature of said preheated mold, usually at least 50° C. below said preheated mold, wherein said cooling mold also has a much greater mass than said blow mold and also has an interior contour essentially identical with and in contact with the exterior surface of said blow mold, (g) maintaining the conditions of (f) until said blown article is cooled under pressure to the desired degree, (h) releasing said pressure and opening said preconditioned mold and thereafter (i) opening said blow mold and removing said heat set article therefrom.

The process of the present invention is applicable to any essentially amorphous, but thermally crystallizable polymer. It finds particular use with poly(ethylene terephthalate) (PET) having an inherent viscosity of at least 0.6 dl/g. Poly(ethylene terephthalate) polymers of particular applicability in the present invention method include polymers where at least 97% of the polymer contains the repeating ethylene terephthalate units of the formula:

with the remainder being minor amounts of ester-forming components, and copolymers of ethylene terephthalate wherein up to about 10 mole percent of the copolymer is prepared from the monomer units selected from butane-1,4-diol; diethylene glycol; propane-1,3-diol; poly(tetramethylene glycol); poly(ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic, adipic; sebacic; decane-1, 10-dicarboxylic acids, and the like, substituted for up to 10 mole percent of the acid moiety (terephthalic acid) in the preparation of the copolymer.

Of course, the poly(ethylene terephthalate) polymer can include various additives that do not adversely affect the polymer. For instance, some such additives are stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the poly(ethylene terephthalate).

Further, according to the present invention, there is provided apparatus for orientation blow molding a parison and heat setting the blown hollow article. In its broadest aspect, such apparatus comprises a relatively low thermal mass highly heat conductive blow mold, a second, larger mold having high mass and having an internal cavity conforming to the exterior surface of said blow mold, and means to preheat said second mold, means to cause said blow mold to be enclosed by said preheated second mold, and means to remove said blow mold from said second mold. In a particular embodiment, such apparatus also includes a third mold larger than said blow mold and having a higher mass than said blow mold, also having an internal cavity conforming to the exterior surface of said blow mold, means to precondition said third mold to a temperature lower than said second mold, means to cause said blow mold to be enclosed by said thermally preconditioned third mold after removal from said second mold, and means to remove said blow mold from said third mold.

The drawings depict one form of apparatus of the invention for effecting the process of the invention.

FIGS. 2, 3 and 4 are drawn to a larger scale than FIG. 1.

Figure 1:
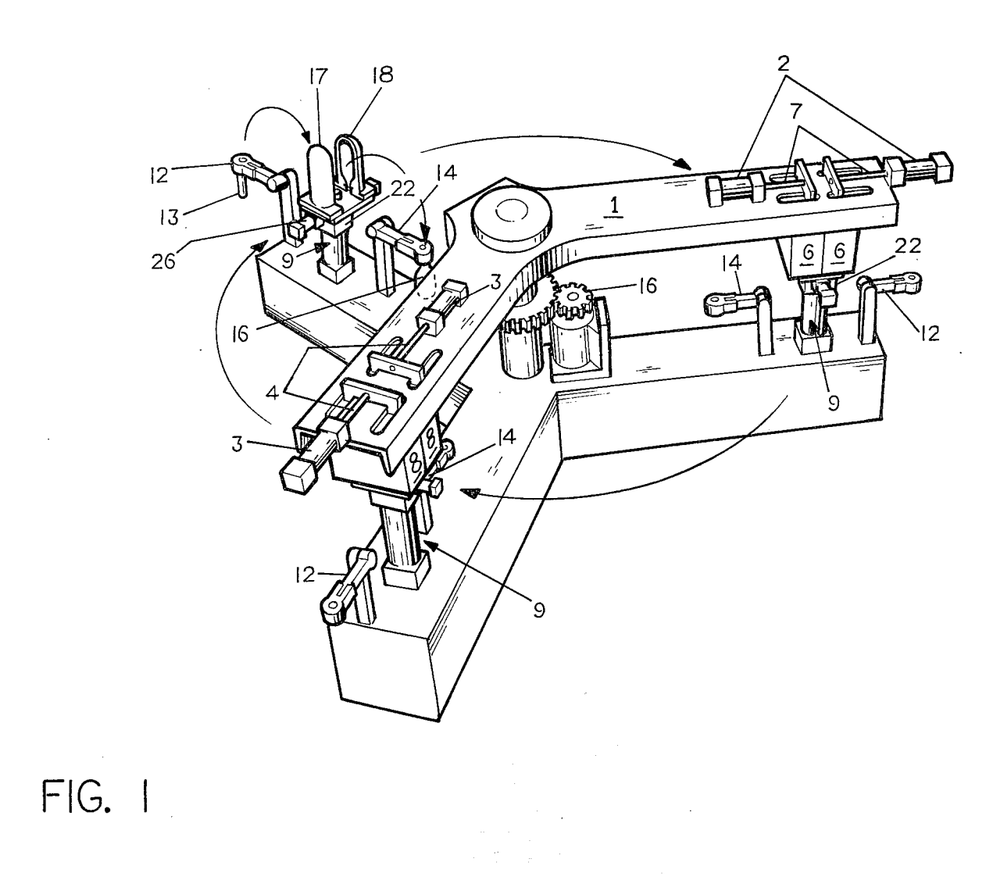
FIG. 1 is a perspective view of the blow molding, heat setting and cooling apparatus of the invention, each station depicting a different stage of the operation. The drawings are not scale drawings.

In FIG. 1, supporting frame 1 is supported by gear mechanism 15 which is driven by power means not shown. On supporting frame 1 are mounted actuating cylinders 2 and actuating cylinders 3, as well as hot mold 8 and cold mold 6. Actuating cylinders 3 actuate rods 4 to which are rigidly connected to hot mold halves 8. Actuating cylinders 2 are similarly attached to and activate actuator cylinder rods 7, which are in turn attached to and support cold mold halves 6.

Actuator cylinders 9 control the upper and downward movement of actuator cylinder rods 11. In FIG. 1, 12 is a robot for inserting parison 13 between blow mold halves 17, 18 and 14 is a robot for removing a finished hollow article or container 16 from between the blow mold halves. Note that everything shown at the station of FIG. 1 where open blow mold 17, 18 is shown is duplicated at the other two stations; thus there are three blow molds 17, 18.

In FIGS. 1, 2 and 4, 17 is the left side of inner cavity mold and 18 is the right side of inner cavity mold. The outlines of the cavity are shown in dotted lines in FIGS. 2 and 4.

Figure 2:
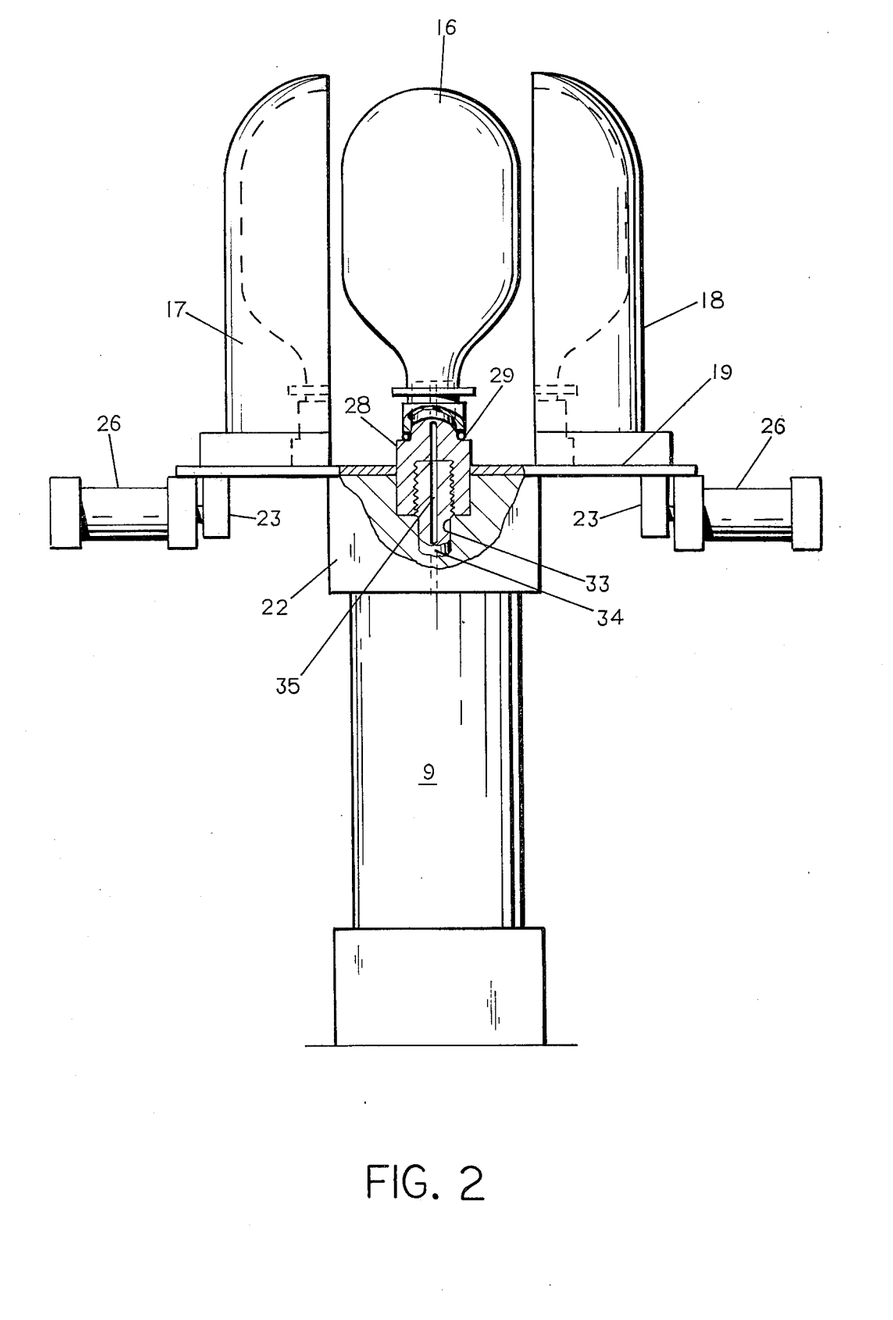
FIG. 2 is a partial side view of that portion of FIG. 1 showing the inner blow mold 17, 18 in open position.
Figure 3:
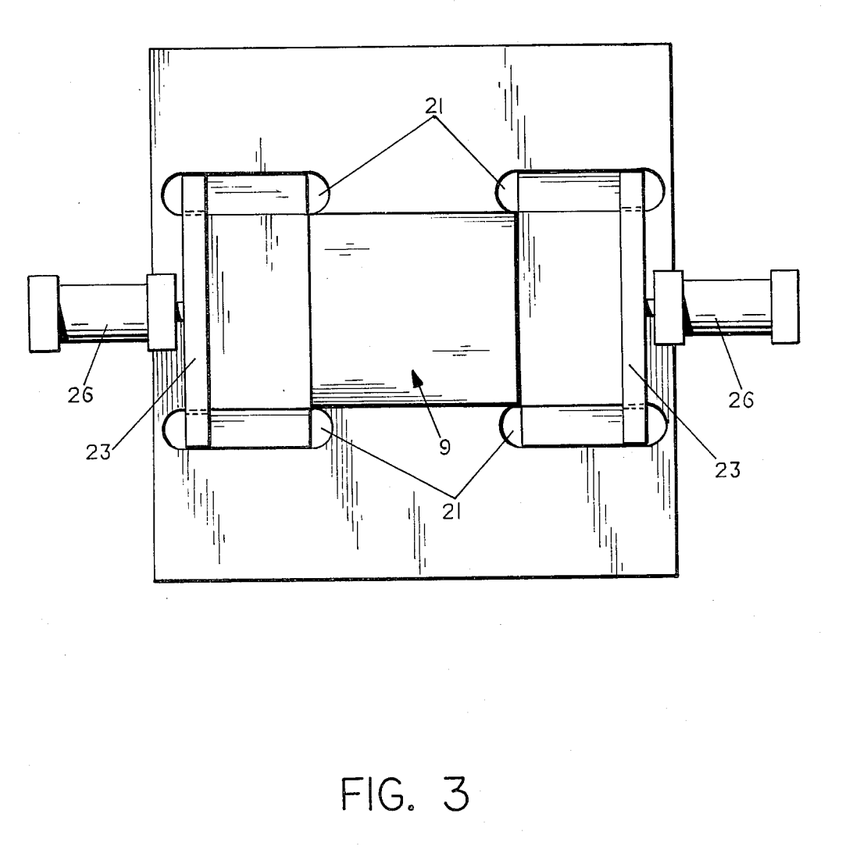
FIG. 3 is a botton view of FIG. 2.
Figure 4:
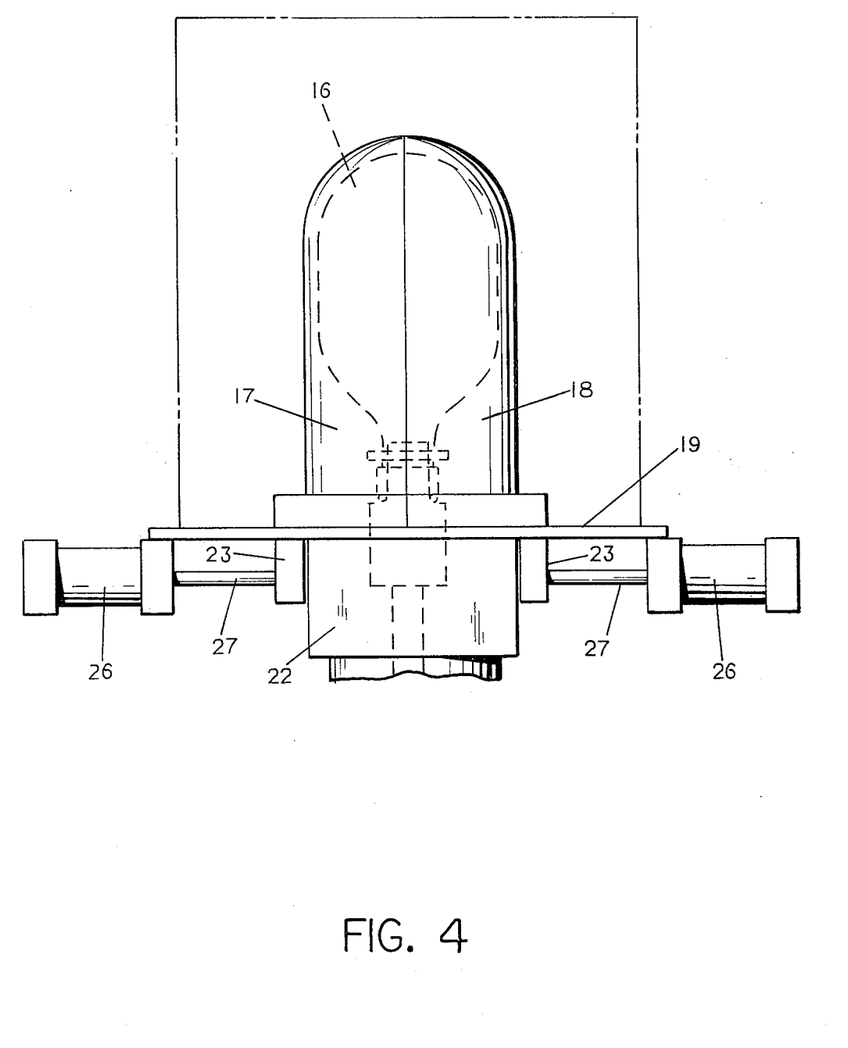
FIG. 4 shows the bottle enclosed within the inner, thin blow mold 17, 18 which is in turn enclosed within the outer heating mold or the outer cooling mold (as indicated by dotted lines).

Cavity mold 17, 18 is a low thermal mass cavity which is split into the two halves 17 and 18. These cavity halves rest on the upper surface of mounting plate 19, on which the cavity halves can slide freely. Mounting plate 19 also has four slots 21 milled into it, and flange 22 of power actuator cylinder 9 is firmly attached to it. Each cavity half, 17 and 18, has a yoke 23 firmly attached to the underside. These yokes are mounted so that both extend through slots 21 in mounting plate 19, and allow the cavity halves 17, 18 to slide freely in a single plane, opposite to each other on the surface of mounting plate 19. The yokes are attached to cavity mold actuator cylinder rods 27. The actuator cylinder 26 for each half of the cavity mold 17, 18 is affixed to mounting plate 19. As both cavity mold actuator cylinders 26 are either extended or retracted, this arrangement allows for a single planar movement of the cavity molds 17, 18 to either open or close on the same parting line.

In FIG. 2, a portion is shown in broken cross-section. Through bore 33 in power cylinder 9 runs shaft 34 which has in turn a bore 35. Threaded to the top of shaft 34 is mandrel 19 which is encircled at a stepped out portion by sealing O-ring 29. The mouth of the parison and the bottle 16 rests against the O-ring 29.

It should be noted that the parting line of the smaller, inner mold is positioned at 90° to the parting line of the outer heating and cooling molds.

The cavities in the halves of hot mold 8 and cold mold 6 are machined to fit against and contact the outer surface of cavity blow molds 17, 18. The ideal area of contact is, of course, one hundred percent of the area. The hot mold can be heated either through electrical resistance heaters embedded in the mold or through circulation of hot heat transfer fluid such as hot oil through intersecting channels milled through the mold block. The cold mold can be cooled through circulation of a relatively cool fluid such as oil, or even water through channels milled through the mold block. Neither the channels or the electrical heating means are shown in the drawings. In order to compensate for the lack of the ideal one hundred percent surface to surface contact between the inner wall of the outer molds and the outer wall of the inner molds when a fluid is used for heating and cooling, it is possible to drill one or more very small weep holes in each half of the outer mold 8 or the outer mold 6 connecting the fluid heat transfer medium channel to the inner surface of the mold half. This will enable fluid to displace air in the points of no contact and to substitute a liquid-metal film for a lower heat transfer gas-metal interface.

The following operation of the process of the invention is described in terms of making an oriented and heat set bottle of poly(ethylene terephthalate) resin (PET) having a typical inherent viscosity of 0.72 dl/g. The heat setting conditions given are for the preferred embodiment for making an oriented, heat set hollow article of PET starting with a resin having an inherent viscosity of at least 0.6 dl/g as measured in a 60/40 weight ratio of phenol to tetrachloroethane solution at 25° C. Density as referred to herein means the density described in ASTM 1505 in the procedure entitled "DENSITY GRADIENT TECHNIQUE."

In operation, cavity molds 17, 18 have been opened by the cavity mold actuator cylinders 26, and previously formed bottle 16 is removed by robot 14, as in FIG. 1. As this bottle is removed, a PET parison 13 formed by injection molding from a resin having an inherent viscosity of 0.72 dl/g is introduced into the cavity blow mold 17, 18 by robot 12, where the parison is firmly seated on top of the sealing "O" ring 29 which circumvents the mandrel 28.

Before insertion into the blow mold 17, 18, the closed bottom parison 13 has been preheated to a temperature conducive to orientation during blow molding. For PET this is usually a temperature in the range from 75° to 115° C., more usually from 85° to 105° C.

The cavity mold halves 8 have been preheated to a temperature desired, usually at least the temperature of the preheated parison. The heat setting takes place in the mold 17, 18 by contact of the hollow article therewith by means of a short dwell time of anywhere from less than a second to 30 seconds. This extra time even at a relatively low temperature approximating the orientation temperature can itself cause further crystallization (heat setting) in addition to the crystallization which takes place as is well known during orientation blow molding of PET. In the more usual and preferred mode of operation, the molds 8 have been preheated to a temperature higher than the temperature of the preheated parison. In the case of PET, this temperature can be up to about 250° C. Usually mold halves 8 are preheated to a temperature in the range of 120° to 125° C., preferably 180° to 250° C., and still more preferably, 220° to 250° C. The molds 17, 18 become heated by contact with the preheated mold halves 8 so that the heat setting temperature is substantially the temperature of the mold halves 8.

In any event, after closed end parison 13 has been placed on mandrel 28 between the open mold halves 17, 18, the mold halves 17, 18 are closed by the cavity mold actuator cylinders 26, and thereafter the actuator cylinder 9 applies pressure to move upwardly shaft 34 slightly so that pressure is exerted between O-ring 29 and the mouth of the parison to effect a hermetic seal.

Meanwhile, the mold halves 8,8 and 6,6 are opened by actuator rods 4 and 7, respectively, exposing closed cavity molds having the identical exterior contour as blow mold 17, 18, the one containing a previously blown and heat set hollow article, and the other containing a previously blown, heat set and cooled hollow article.

Then the open hot mold halves 8,8 are indexed to a position surrounding the just closed molds 17, 18 and the open cold molds 6,6 surround the blow mold cavity previously enclosed by hot molds 8,8. Actuating rods 4 close hot molds 8,8 around the now closed mold 17, 18 (as in FIG. 4), the parison is blown to a bottle 16 by introducing gas under pressure through bore 35. As is well known, the blowing pressure in orientation blow molding is usually at least 100 pounds per square inch gauge, usually more than this. Suffice it to say the specific pressure above 100 psig which can be used is well known and is not part of the present invention. Molds 8,8 heat cavity mold 17, 18 to heat setting temperature (for instance 240° C.) and 17, 18 in turn heat bottle 16 (see FIG. 4) to this heat setting temperature. This temperature is held for a short time as pointed out before. The time from the moment that the hollow article 16 is fully blown in the position shown in FIG. 4, until the cold mold halves 6 close around molds 17, 18, is essentially the heat setting time. As stated, usually this is a total of from about 0.5 to 30 seconds. In most practical instances, it is from 1 to 3 seconds.

The maximum pressure within the molded hollow article 16 which it is possible to maintain when mold halves 8 are opened depends on the strength of the walls of light weight mold halves 17, 18. If mold 17, 18 is strong enough to withstand blowing pressure, no adjustment need be made in the pressure before opening hot mold halves 8. If it is necessary or desirable to reduce the pressure before opening hot mold halves 8, this is done, but sufficient pressure is maintained to prevent shrinkage of hollow article 16 and to keep the walls of 16 in firm contact with the walls of 17, 18.

After reducing the pressure somewhat, if necessary or desired, hot molds 8,8 are opened (so are previously closed cold molds 6,6 at another station), and the apparatus is indexed to the next position so that open cold mold halves 6,6 now surround closed mold 17, 18 at the station at which 17, 18 are shown in FIG. 1. Cold mold 6,6 is then closed in contact with the exterior of cavity blow mold 17, 18 by actuator rods 7, as in FIG. 4. Contact is maintained while bottle 16 is under a pressure at least sufficient to prevent shrinkage thereof during this cooling step.

Cold mold 6,6 has been previously temperature conditioned and continues to be maintained at a desired quench temperature lower than the temperature of heated cavity molds 17, 18. This can be as low as room temperature or lower or as high as 50° C. below the heat setting temperature employed in the position of FIG. 3. The reasons for the great variance possible in the temperature to which the hollow article 16 is cooled before releasing the pressure from the inside of the hollow article 16 are diverse and form no part of the present invention. Suffice it to say that the hollow article 16 must be cooled enough at least to prevent gross shrinkage leading to misshapening of the hollow article, and that the method and apparatus of the present invention is an efficient method to limit the time in the blow molding station to that needed for blowing and heat setting, in fact, to somewhat less than the total heat setting time. Eliminated is the time that it would take to cool a single mold down from its high heat setting temperature and subsequently again to heat up the single mold to heat setting temperature. Moreover, as soon as a hot mold 8,8 is opened, it can be immediately indexed to the next station and receive another closed blow mold for blowing and heat setting, thus shortening the cycle time.

After the cooling has been effected as described, the cold mold actuator cylinders 2 open the cold molds 6,6 and the apparatus is again indexed to the position shown in FIG. 1, the pressure in bottle 16 vented, molds 17, 18 opened and bottle 16 removed by robot 14. The entire described cycle is repeated again. Furthermore, it is understood that all of the operations described as taking place at the position of FIG. 1 showing mold 17, 18, are taking place at different stages at the other two stations.

It will be understood that it is possible to have double or triple, etc., the number of stations in the circular path in which only 3 stations are depicted in FIG. 1.

As will be evident to those skilled in the art, various modifications of this invention can be made or followed in the light of the foregoing disclosure and discussion without departing from the spirit and scope of the disclosure or from the scope of the claims.

I claim:

1. A method of effecting orientation blow molding, heat setting and cooling of a thermally crystallizable polymer comprising
   (a) providing a hollow parison of an essentially amorphous, thermally crystallizable polymer, preheated to a temperature range conducive to orientation during stretching,
   (b) enclosing said parison in the halves of a blow mold of low mass capable of rapidly conducting heat,
   (c) enclosing said blow mold within the halves of a mold of much greater mass than said blow mold, preheated to a heat setting temperature at least as high as the orientation temperature of said parison, the interior contour of said preheated mold in closed position being essentially identical with and in contact with the exterior surface of said blow mold,
   (d) step (c) heating said blow mold to essentially the heat setting temperature of said preheated mold,
   (e) orientation blow molding said parison, by application of internal pneumatic pressure thereto, so that said parison tightly conforms to the interior contour of said blow mold and heat is transferred to the blown article by the hot walls thereof at said heat setting temperature, thus heat setting the blown hollow article, and thereafter
   (f) while maintaining at least sufficient pressure on said heat set article to prevent shrinkage thereof and thus to keep it in firm contact with the interior walls of said blow mold, removing said blow mold without cooling from said preheated mold and then
   (g) repeating the foregoing steps using another hollow parison and another blow mold of low mass, but using the same, still preheated mold in step (c).

2. A method of effecting orientation blow molding, heat setting and cooling of a thermally crystallizable polymer comprising
   (a) providing a hollow parison of an essentially amorphous, thermally crystallizable polymer, preheated to a temperature range conducive to orientation during stretching,
   (b) enclosing said parison in the halves of a blow mold of low mass capable of rapidly conducting heat,
   (c) enclosing said blow mold within the halves of a mold of much greater mass than said blow mold, preheated to a heat setting temperature at least as high as the orientation temperature of said parison, the interior contour of said preheated mold in closed position being essentially identical with and in contact with the exterior surface of said blow mold,
   (d) step (c) heating said blow mold to essentially the heat setting temperature of said preheated mold,
   (e) orientation blow molding said parison, by application of internal pneumatic pressure thereto, so that said parison tightly conforms to the interior contour of said blow mold and heat is transferred to the blown article by the hot walls thereof at said heat setting temperature, thus heat setting the blown hollow article, and thereafter
   (f) while maintaining at least sufficient pressure on said heat set article to prevent shrinkage thereof and thus to keep it in firm contact with the interior walls of said blow mold, removing said blow mold without cooling from said preheated mold,
   (g) cooling said blow mold to a desired cooling or quenching temperature below the temperature of said preheated mold and thus by contact with said blow mold cooling said heat set article while under pressure to the desired degree below the temperature of heat setting, and thereafter
   (h) releasing the pressure from said article and opening the blow mold and removing the article therefrom.

3. A process of claim 2 wherein said heat set article is cooled in step (g) to at least 50° C. below the temperature of heat setting.

4. A process of claim 2 wherein said cooling of the blow mold in step (g) is effected by contacting it with a relatively cool fluid, a liquid or a gas.

5. A process of claim 4 wherein said heat set article is cooled in step (g) to at least 50° C. below the temperature of heat setting.

6. A process of claim 5 wherein said cooling of the blow mold in step (g) is effected by contacting it with a relatively cool fluid, a liquid or a gas.

7. A method of effecting orientation blow molding, heat setting and cooling of a thermally crystallizable polymer comprising (a) providing a hollow parison of an essentially amorphous, thermally crystallizable polymer, preheated to a temperature range conducive to orientation during stretching, (b) enclosing said parison in the halves of a blow mold of low mass capable of rapidly conducting heat, (c) enclosing said blow mold within the halves of a mold of much greater mass than said blow mold, preheated to a heat setting temperature at least as high as the orientation temperature of said parison, the interior contour of said preheated mold in closed position being essentially identical with and in contact with the exterior surface of said blow mold, (d) step (c) heating said blow mold to essentially the heat setting temperature of said preheated mold, (e) orientation blow molding said parison, by application of internal pneumatic pressure thereto, so that said parison tightly conforms to the interior contour of said blow mold and heat is transferred to the blown article by the hot walls thereof at said heat setting temperature, thus heat setting the blown hollow article, and thereafter (f) while maintaining at least sufficient pressure on said heat set article to prevent shrinkage thereof and thus to keep it in firm contact with the interior walls of said blow mold, removing said blow mold from said preheated mold and enclosing it in a cooling mold which is preconditioned to a desired cooling or quenching temperature below the temperature of said preheated mold, wherein said cooling mold also has a much greater mass than said blow mold and also has an interior contour essentially identical with and in contact with the exterior surface of said blow mold, (g) maintaining the conditions of (f) until said blown article is cooled under pressure to the desired degree, (h) releasing said pressure and opening said preconditioned mold and thereafter (i) opening said blow mold and removing said heat set article therefrom.

8. A process according to claim 7 wherein the temperature of said cooling mold is at least 50° C. below the temperature of said preheated mold.

* * * * *

UNITED STATES PATENT AND TRADEMARK OFFICE
CERTIFICATE OF CORRECTION

PATENT NO. : 4,439,394
DATED : March 27, 1984
INVENTOR(S) : John Appleyard

It is certified that error appears in the above-identified patent and that said Letters Patent are hereby corrected as shown below:

Col. 1, lines 13 and 14, change "increasing" to --increases--;
Col. 6, line 16, change "125°C." to --250°C.--

Signed and Sealed this

Eleventh Day of September 1984

[SEAL]

Attest:

GERALD J. MOSSINGHOFF

Attesting Officer

Commissioner of Patents and Trademarks